(12) United States Patent
Kim et al.

(10) Patent No.: US 12,181,344 B2
(45) Date of Patent: Dec. 31, 2024

(54) THERMAL INFRARED DETECTOR

(71) Applicant: SAMSUNG ELECTRONICS CO., LTD., Suwon-si (KR)

(72) Inventors: Dongkyun Kim, Suwon-si (KR); Jinmyoung Kim, Hwaseong-si (KR); Hyuck Choo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 678 days.

(21) Appl. No.: 17/378,293

(22) Filed: Jul. 16, 2021

(65) Prior Publication Data

US 2022/0205843 A1    Jun. 30, 2022

(30) Foreign Application Priority Data

Dec. 24, 2020 (KR) .................. 10-2020-0183610

(51) Int. Cl.
 *G01J 5/24* (2006.01)
 *G01J 5/00* (2022.01)
 *G01J 5/20* (2006.01)

(52) U.S. Cl.
 CPC .......... *G01J 5/24* (2013.01); *G01J 2005/0077* (2013.01); *G01J 2005/202* (2013.01)

(58) Field of Classification Search
 None
 See application file for complete search history.

(56) References Cited

U.S. PATENT DOCUMENTS

| | | | |
|---|---|---|---|
| 7,491,937 B2 | 2/2009 | Nakanishi et al. | |
| 7,645,990 B2 | 1/2010 | Takemura et al. | |
| 8,373,561 B2 | 2/2013 | Manning | |
| 10,051,210 B2 | 8/2018 | Nussmeier et al. | |
| 2015/0319379 A1* | 11/2015 | Nussmeier | G01J 5/22 |
| | | | 348/165 |
| 2019/0297295 A1 | 9/2019 | Roberts et al. | |
| 2020/0068145 A1* | 2/2020 | Lacroix | H04N 3/14 |

FOREIGN PATENT DOCUMENTS

| | | |
|---|---|---|
| JP | 9-42924 A | 2/1997 |
| JP | 4720341 B2 | 7/2011 |
| JP | 4901320 B2 | 3/2012 |

(Continued)

OTHER PUBLICATIONS

Communication dated Feb. 28, 2022 issued by the European Patent Office in European Application No. 21199810.9.

*Primary Examiner* — Marcus H Taningco
(74) *Attorney, Agent, or Firm* — Sughrue Mion, PLLC

(57) ABSTRACT

Provided is a thermal infrared detector including a thermal infrared sensor array including a plurality of resistive infrared devices that are provided in a plurality of rows and a plurality of columns, and a driving circuit configured to drive the thermal infrared sensor array, wherein at least two resistive infrared devices among the plurality of resistive infrared devices adjacent to each other in a row direction or a column direction are grouped together, wherein at least one resistive infrared device among the plurality of resistive infrared devices is shared by at least two groups, and wherein at least two resistive infrared devices among the plurality of resistive infrared devices that are included in each of the at least two groups are connected in series.

18 Claims, 13 Drawing Sheets

(56) References Cited

FOREIGN PATENT DOCUMENTS

| | | |
|---|---|---|
| JP | 5292689 B2 | 9/2013 |
| JP | 5392005 B2 | 1/2014 |
| KR | 10-2007-0086063 A | 8/2007 |
| WO | 03/067874 A1 | 8/2003 |
| WO | 2009/008580 A1 | 1/2009 |
| WO | 2020/072134 A2 | 4/2020 |

\* cited by examiner

THERMAL INFRARED DETECTOR

CROSS-REFERENCE TO RELATED APPLICATION

This application is based on and claims priority under 35 U.S.C. § 119 to Korean Patent Application No. 10-2020-0183610, filed on Dec. 24, 2020 in the Korean Intellectual Property Office, the disclosure of which is incorporated by reference herein in its entirety.

BACKGROUND

1. Field

Example embodiments of the present disclosure relate to a thermal infrared detector.

2. Description of Related Art

Thermal infrared devices convert heat generated within a device into an electrical signal by absorbing far-infrared (LWIR) energy emitted from an object to be measured. Thermal imaging cameras or thermography may convert signals of a plurality of thermal infrared devices arranged in a two-dimensional array into a thermal image, so that a temperature difference of an object to be measured or a whole scene may be seen with the naked eye. Typical thermal infrared detection devices operating at room temperature may include a bolometric device, a thermopile, and a pyroelectric device. These devices are used in various small or portable applications because they do not need a cryogenic cooling system.

SUMMARY

One or more example embodiments provide a thermal infrared detector, a thermal infrared sensor array, and a driving method thereof.

Additional aspects will be set forth in part in the description which follows and, in part, will be apparent from the description, or may be learned by practice of example embodiments.

According to an aspect of an example embodiment, there is provided a thermal infrared detector including a thermal infrared sensor array including a plurality of resistive infrared devices that are provided in a plurality of rows and a plurality of columns, and a driving circuit configured to drive the thermal infrared sensor array, wherein at least two resistive infrared devices among the plurality of resistive infrared devices adjacent to each other in a row direction or a column direction are grouped together, wherein at least one resistive infrared device among the plurality of resistive infrared devices is shared by at least two groups, and wherein at least two resistive infrared devices among the plurality of resistive infrared devices that are included in each of the at least two groups are connected in series.

The thermal infrared detector may further include a connection switch connected between the at least two resistive infrared devices included in each of the at least two groups.

A number of the plurality of rows may be M, a number of the plurality of columns may be N, where M and N may be each a natural number greater than or equal to 3.

Each pixel among a plurality of pixels including each of the plurality of resistive infrared devices may include a first switch having a first end connected to a row direction line and a second end connected to a first end of the each of the plurality of resistive infrared devices, and a second switch having a first end connected to a column direction line and a second end connected to a second end of the each of the plurality of resistive infrared devices.

Each pixel among a plurality of pixels including each of the plurality of resistive infrared devices may include a first switch switching from a row direction line based on a row selection signal, and having a first end connected to a first end of the each of the plurality of resistive infrared devices and a second end connected to a column direction line, and a second switch having a first end connected to a second end of the each of the plurality of resistive infrared devices and a second end that is grounded.

The driving circuit may be further configured to sequentially drive pixel groups including adjacent pixels among a plurality of pixels provided in the plurality of rows and the plurality of columns, and turn on the connection switch to measure series resistance of the at least two resistive infrared devices in each pixel group.

The driving circuit may be further configured to output a connection signal to turn the connection switch on, and output a first row selection signal to select a first row among the plurality of rows.

The driving circuit may be further configured to output a first connection signal to turn on the connection switch that connects a first resistive infrared device in a first row among the plurality of rows to a grouped first resistive device in a second row, output a first row selection signal to select the first resistive infrared device in the first row, such that the first switch connected to a first end of the first resistive infrared device in the first row is turned on based on the first row selection signal, and output a first column selection signal to select a first column among the plurality of columns, such that the second switch connected to a second end of the first resistive infrared device in the second row is turned on based on the first column selection signal.

The driving circuit may be further configured to output a second connection signal to turn on the connection switch that connects a second resistive infrared device in the first row to a grouped second resistive device in the second row, output a first-second row selection signal to select the second resistive infrared device in the first row, such hat the first switch connected to a first end of the second resistive infrared device in the first row is turned on based on the first row selection signal, and output a second column selection signal to select a second column among the plurality of columns, such that the second switch connected to a second end of the second resistive infrared device in the second row is turned on based on the second column selection signal.

The driving circuit may be further configured to output a first connection signal to turn on the connection switch that connects a first resistive infrared device in a first row among the plurality of rows to a grouped second resistive infrared device in the first row, output a first row selection signal to select the first resistive infrared device in the first row among the plurality of rows, such that the first switch connected to a first end of the first resistive infrared device in the first row is turned on based on the first row selection signal, and output a second column selection signal to select a second column among the plurality of columns, such that the second switch connected to a second end of a second resistive infrared device in the first row is turned on based on the second column selection signal.

The driving circuit may be further configured to output a second connection signal to turn on the connection switch that connects the second resistive infrared device in the first row to a grouped third resistive infrared device in the first row, output a first-second row selection signal to select the second resistive infrared device in the first row among the plurality of rows, such that the first switch connected to a first end of the second resistive infrared device in the first row is turned on based on the first row selection signal, and output a third column selection signal to select a third column among the plurality of columns, such that the second switch connected to a second end of a third resistive infrared device in the first row is turned on based on the third column selection signal.

Each of the plurality of resistive infrared devices may include a bolometer.

According to another aspect of an example embodiment, there is provided a thermal infrared sensor array including a plurality of resistive infrared devices connected to M row electrodes and N column electrodes, a plurality of first switches, each of the plurality of first switches being connected between a first end of each of the plurality of resistive infrared devices and a corresponding row electrode line, a plurality of second switches, each of the plurality second switches being connected between a second end of each of the plurality of resistive infrared devices and a corresponding column electrode line, and a plurality of connection switches connected in series between adjacent resistive infrared devices among the plurality of resistive infrared devices, respectively, to group at least two adjacent resistive infrared devices in a row direction or a column direction.

Each of M and N may be a natural number greater than or equal to 3, a size of a group may be m in the row direction and n in the column direction, where m is a natural number less than M, n is a natural number less than N, and both m and n are not 1.

At least two groups may share at least one resistive infrared device.

Each of the plurality of connection switches may be provided at a first pixel including one of the plurality of resistive infrared devices, one of the plurality of first switches, and one of the plurality of second switches or a second pixel that is grouped with the first pixel that is adjacent to the second pixel in the row direction or the column direction.

Each of the plurality of resistive infrared devices may include a bolometer.

The method may include turning a connection switch among the plurality of connection switches on based on a connection signal, the connection switch being provided between one of the plurality of resistive infrared devices in an m-th row and one of the plurality of resistive infrared devices in an (m+1)th row, the one of the plurality of resistive infrared devices in the (m+1)th row being grouped with the one of the plurality of resistive infrared devices in the m-th row, turning one of the plurality of first switches on based on an m-th row selection signal, the one of the plurality of first switches being connected to a first end of an resistive infrared device in the m-th row and an n-th column, turning one of the plurality of second switches on based on an n-th column selection signal, the one of the plurality of second switches being connected to a second end of the resistive infrared device in the (m+1)th row and the n-th column, and obtaining series resistance of the resistive infrared device in the m-th row and the n-th column and the resistive device in the m-th row and the (n+1)th column, where m is a natural number less than M and n is a natural number less than N.

The method may include turning a connection switch among the plurality of connection switches on based on a connection signal, the connection switch being provided between one of the plurality of resistive infrared devices in an m-th row and an n-th column and one of the plurality of resistive infrared devices in the m-th row and an (n+1)th column, the one of the plurality of resistive infrared devices in the m-th row and the n-th column being grouped with the one of the plurality of resistive infrared devices in the m-th row and the (n+1)th column, turning one of the plurality of first switches on based on an m-th row selection signal, the one of the plurality of first switches being connected to a first end of an resistive infrared device in the m-th row and the n-th column, turning one of the plurality of second switches on based on an (n+1)th column selection signal, the one of the plurality of second switches being connected to a second end of the resistive infrared device in the m-th row and the (n+1)th column, and obtaining series resistance of the resistive infrared device in the m-th row and the n-th column and the resistive device in the m-th row and the (n+1)th column, where m is a natural number less than M and n is a natural number less than N.

According to yet another aspect of an example embodiment, there is provided a method of driving a thermal infrared sensor, the method including turning a first switch on based on receiving an m-th row selection signal, the first switch being connected to a first end of a resistive infrared device among a plurality of resistive infrared devices in an m-th row and an n-th column, selectively turning a switch on based on a connection signal, the switch being connected between the plurality of resistive infrared devices, to electrically serially connect P×Q resistive infrared devices included from the m-th row to a (m+P−1)th row and from the n-th column to an (n+Q−1)th column, turning a second switch on based on an (n+Q−1)th column selection signal, the second switch being connected to a second end of one of the plurality of resistive infrared devices in the (n+Q−1)th column and from the m-th row to an (m+P−1)th row, and obtaining series resistance of the P×Q resistive infrared devices, where m is a natural number less than M, n is a natural number less than N, P is a natural number less than M, Q is a natural number less than N, and both P and Q are not 1.

According to yet another aspect of an example embodiment, there is provided a thermal infrared detector including a pixel array including a plurality of pixels provided in a plurality of rows and a plurality of columns, the plurality of pixels including a plurality of resistive infrared devices, respectively, and a driving circuit configured to drive the pixel array, wherein the pixel array includes a plurality of groups of pixels respectively including at least two resistive infrared devices among the plurality of resistive infrared devices adjacent to each other in a row direction or a column direction, wherein the plurality of groups of pixels overlap with each other such that at least two resistive infrared devices are shared by at least two groups of pixels, and wherein the at least two resistive infrared devices that shared by the at least two groups of pixels are connected in series.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
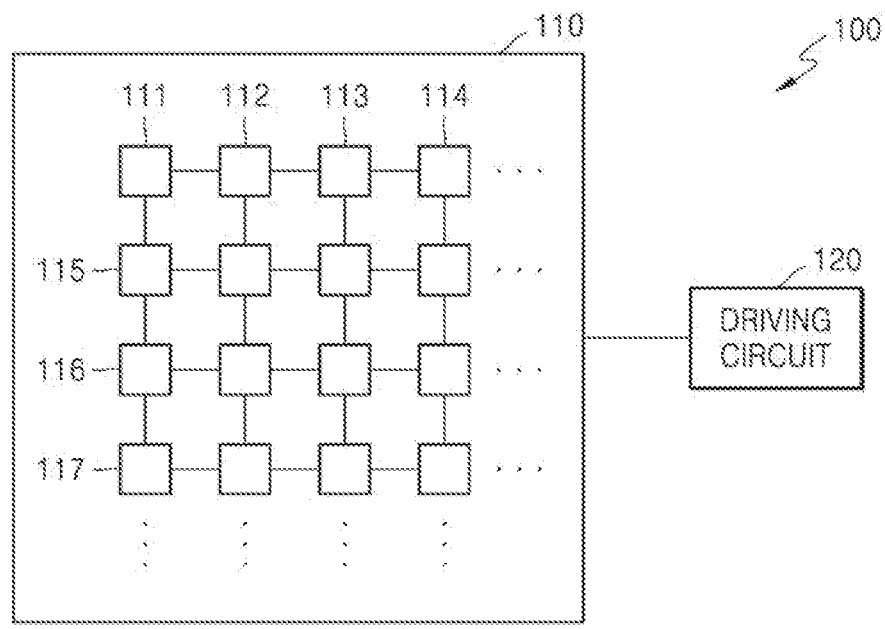
FIG. 1 illustrates a thermal infrared detector according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms used in the disclosure have been selected from currently widely used general terms in consideration of the functions in the disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the disclosure are defined based on their meanings in relation to the contents discussed throughout the specification, not by their simple meanings.

Terms such as "first" and "second" are used herein merely to describe a variety of constituent elements, but the constituent elements are not limited by the terms. Such terms are used only for the purpose of distinguishing one constituent element from another constituent element.

The terminology used herein is not intended to limit embodiments. As used herein, the singular forms "a," "an" and "the" are intended to include the plural forms as well, unless the context clearly indicates otherwise. Furthermore, in example embodiments, when a layer, region, or component is referred to as being electrically connected to another layer, region, or component, it can be directly electrically connected to the other layer, region, or component or indirectly electrically connected to the other layer, region, or component via intervening layers, regions, or components Furthermore, it will be further understood that the terms "comprises" and/or "comprising" used herein specify the presence of stated features or components, but do not preclude the presence or addition of one or more other features or components.

The use of the terms "a" and "an" and "the" and similar referents in the context of describing the disclosure (especially in the context of the following claims) are to be construed to cover both the singular and the plural. Furthermore, the steps of all methods described herein can be performed in any suitable order unless otherwise indicated herein or otherwise clearly contradicted by context. The disclosure is not limited to the described order of the steps.

The disclosure may be described in terms of functional block components and various processing steps. Such functional blocks may be realized by any number of hardware and/or software components configured to perform the specified functions. For example, the functional blocks related to embodiments may be implemented by one or more microprocessors or other circuit configurations for a predetermined function. Furthermore, functional blocks may be implemented with any programming or scripting language. Furthermore, functional blocks may be implemented by algorithm executed in one or more processors. An embodiment may employ conventional technologies for electronic environment settings, signal processing, and/or data processing, and the like.

The connecting lines or connectors shown in the various figures presented are intended to represent functional relationships and/or physical or logical couplings between the various elements. It should be noted that many alternative or additional functional relationships, physical connections or logical connections may be present in a practical device.

The disclosure will now be described more fully with reference to the accompanying drawings, in which example embodiments of the disclosure are shown. The disclosure may, however, be embodied in many different forms and should not be construed as being limited to the example embodiments set forth herein In an example embodiment, a thermal infrared detector may be applied to a read-out circuit IC and a signal detection control circuit of a thermal imaging system.

In an example embodiment, a thermal infrared sensor array may include a plurality of thermal infrared devices that are configured in a two-dimensional array, which may convert output signals from the thermal infrared devices to a thermal image so that a temperature difference of an object to be measured or the whole scene is displayed.

In an example embodiment, although a thermal infrared device may be described as a bolometric resistive device, embodiments are not limited thereto, and the thermal infrared device may include a thermopile or a pyroelectric device.

In an example embodiment, a group or grouping may be combining a plurality of devices arranged a sensor array in a row direction and/or a column direction.

In an example embodiment, a pixel may be a device implemented in a pixel array, and one pixel may include a thermal infrared device, a row selection switch, a column selection switch, and the like.

FIG. 1 illustrates a thermal infrared detector 100 according to an example embodiment.

Referring to FIG. 1, the thermal infrared detector 100 may include a pixel array 110 and a driving circuit 120.

The thermal infrared detector 100 may be implemented by a non-cooling type thermal imaging camera. The non-cooling type thermal imaging camera may include an optical system, a focal plane array, a signal processor, a signal controller, a temperature stabilizer, and a display. In the optical system, infrared light radiated from an object or scene is projected onto a focal plane array through infrared lenses. The infrared radiation energy projected onto the focal plane array is converted to electrical signals by the focal plane array sensor and the signal processor and then changed to digital signals through analog-digital conversion. To reduce heat conduction to ambient atmosphere, the focal plane array may be arranged in vacuum packaging and an infrared window may be arranged in front of the focal plane array. The data converted to digital signals is converted to image data through offset correction, amplification correction, and other signal processing in the signal processor, and displayed on a screen. The offset and amplification correction may be performed by additionally adding a reference device in units of rows or in units of columns. The temperature stabilizer may allow sensors of the focal plane array to operate under a constant temperature condition.

Referring back to FIG. 1, the pixel array 110 may include a plurality of devices 111 to 117 arranged in a row direction and a column direction. The devices 111 to 117 may be sensors such as a thermal infrared sensor, a resistive infrared device, or a bolometer device. Although the device is described as a resistive infrared device, for example, a bolometer device, the device may be other types of sensors such as, for example, a thermopile, or a pyroelectric device. The pixel array 110 may be implemented by a plurality of infrared detection devices arranged on a silicon substrate in a two-dimensional array.

The driving circuit 120 may include a readout integrated circuit (ROIC) to detect a change of the characteristics of each detection device. The driving circuit 120 may sequentially drive all pixels of the pixel array 110 to read out data from the infrared detection device or resistive infrared device and detect the temperature of an object to be measured.

The driving circuit 120 may further include a bias circuit for generating a bias signal, a row selection circuit for optionally activating a detection device, a column selection circuit, column channel amplification circuits, a sample and hold circuit, a column multiplexer, an output buffer circuit, and the like.

A signal path from one pixel to an output is as follows. An active bolometer Ra is biased via a switch Sa. A reference bolometer Rb that is blinded may be connected to an end of each column. To integrate a difference of a current flowing in the active bolometer Ra and the blind bolometer Rb, an amplification (trans-impedance amplifier) circuit is used. The output voltage of an amplifier is accumulated in a capacitor Csh by an operation of a switch Sh, and then sent to an output voltage Vout by an operation of a switch Ss.

One end of an active bolometer resistance R1 is connected to a bias voltage. The other end of the active bolometer resistance R1 is connected to a first column line $col_1$ via a first switch $S_{01}$. A switching control line of the switch S1 is connected to a first row line $row_1$. An end of the first column line $col_1$ is connected to a blind resistance Rb1 and an input port of an amplifier to be connected to a reference voltage. Time interleaving driving measures resistance of the devices arranged at a certain interval to obtain and display a thermal image. A timing control circuit is configured to control timing of a row selection circuit and a column selection circuit. The row selection circuit, in response to a signal from the timing control circuit, optionally activates one of row lines. The row selection circuit may be implemented by a multiplexer or other type of component/device.

The pixel array 110 may include a plurality of resistive infrared devices 111 to 117 connected to M row electrodes and N column electrodes. M denotes the number of electrodes in a row direction, and N denotes the number of electrodes in a column direction. A plurality of resistive infrared devices are grouped in a row direction or a column direction. For example, in the row direction, the resistive infrared device 111 and the resistive infrared device 112 are grouped into one, the resistive infrared device 112 and the resistive infrared device 113 are grouped into one, and the resistive infrared device 113 and the resistive infrared device 114 are grouped into one, thereby grouping all pixels. In the column direction, the resistive infrared device 111 and the resistive infrared device 115 are grouped into one. In an example embodiment, M and N are natural numbers greater than or equal to 3.

In an example embodiment, a signal is detected from pixel groups including neighboring m×n pixels, where m and n are natural numbers, but both m and n are not 1. In this state, there are pixels included in two or more pixel groups. The pixels included in the same pixel group are electrically connected to each other to operate as one bolometer resistance. Individual pixels are included in at least one pixel group. The grouping is described below with reference to FIGS. 2 and 3.

Figure 2:
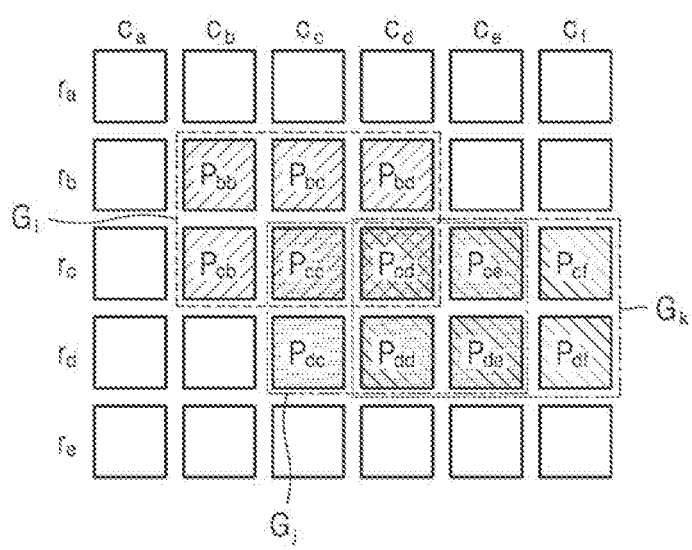
FIG. 2 is a conceptual diagram of pixel grouping according to an example embodiment.

FIG. 2 is a conceptual diagram of pixel grouping according to an example embodiment.

Referring to FIG. 2, a first row $r_a$, a second row $r_b$, a third row $r_c$, a fourth row $r_d$, and a fifth row $r_e$ in a row direction, and a first column $c_a$, a second column $c_b$, a third column $c_c$, a fourth column $c_d$, a fifth column $c_e$, and a sixth column $c_f$ in a column direction are illustrated. In an example embodiment as illustrated in FIG. 2, an M×N pixel array, where M is 5 and N is 6, and an m×n pixel group, where m is 2 and n is 3, are described. Although an example of M×N that is 5×6 and m×n that is 2×3 is described, embodiments are not limited thereto, and various modifications are available according to the design and applied field of an infrared sensor.

In an example embodiment, a pixel group of 2×3 include six pixels. Six pixels $p_{bb}$, $p_{bc}$, $p_{bd}$, $p_{cb}$, $p_{cc}$, and $p_{cd}$ included in a pixel group G are electrically connected to each other and operate as one bolometer resistance. As more infrared light is absorbed in a relatively large area compared to an individual pixel, a signal change amount is increased. Likewise, six pixels $p_{cc}$, $p_{cd}$, $p_{ce}$, $p_{dc}$, $p_{dd}$, and $p_{de}$ included in a pixel group G are electrically connected to each other and operate as one bolometer resistance. Six pixels $p_{cd}$, $p_{ce}$, $p_{cf}$, $p_{dd}$, $p_{de}$, and $p_{df}$ included in a pixel group $G_k$ are electrically connected to each other and operate as one bolometer resistance. The pixel $p_{cc}$ is included in both of the pixel group $G_i$ and the pixel group $G_j$. The pixel $p_{cd}$ is included in all of the pixel groups $G_i$, $G_j$, and $G_k$. The pixels $p_{ce}$, $p_{dd}$, and $p_{de}$ are included in both of the pixel groups $G_j$ and $G_k$. As illustrated in FIG. 2, the respective pixel groups share at least one pixel. The pixel groups $G_i$ and $G_j$ share the pixel $P_{cc}$ and the pixel $P_{cd}$. As illustrated in FIG. 2, when an interval between neighboring pixel groups matches a pixel pitch, image data of the same space resolution may be obtained.

Figure 3:
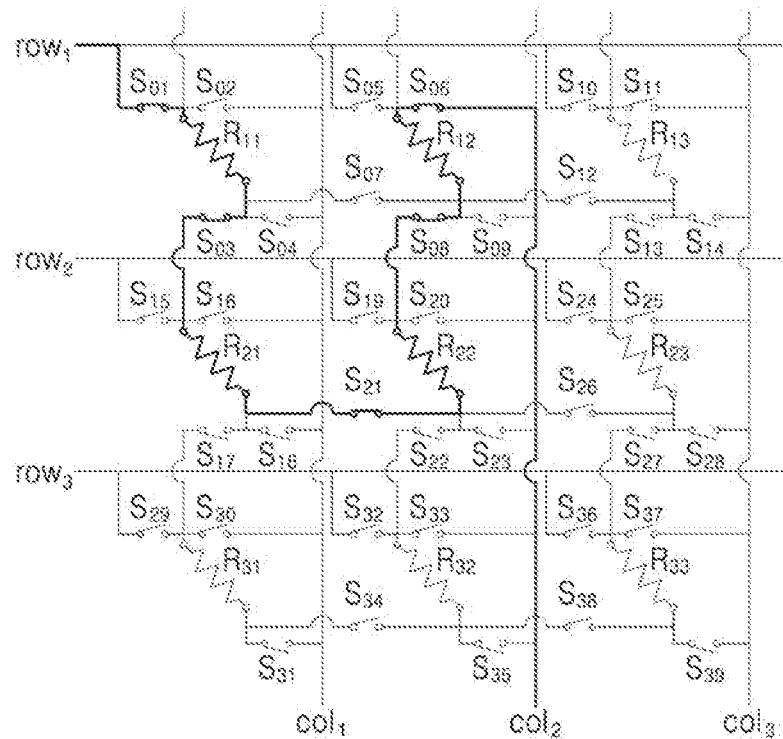
FIG. 3 is a circuit diagram of signal detection of pixel grouping according to another example embodiment.

FIG. 3 is a circuit diagram of signal detection of pixel grouping according to another example embodiment.

Referring to FIG. 3, the signal detection of a 2×2 pixel group is described. As illustrated in FIG. 3, there are three row lines $row_1$ to $row_3$ and three column lines $col_1$ to $col_3$. A pixel of the first row $row_1$ and the first column line $col_1$ may include a resistive bolometer resistance $R_{11}$ and first to fourth switches $S_{01}$ to $S_{04}$. A pixel of the first row $row_1$ and the second column $col_2$ may include a resistive infrared device $R_{12}$ and fifth to ninth switches $S_{05}$ to $S_{09}$.

A pixel of the second row line $row_2$ and the first column line $col_1$ may include a resistive bolometer resistance $R_{21}$ and fifteenth to eighteenth switches $S_{15}$ to $S_{18}$. A pixel of the second row line $row_2$ and the second column $col_2$ may include a resistive infrared device $R_{22}$ and nineteenth to twenty-third switches $S_{19}$ to $S_{23}$. Similarly, the other pixels may be arranged by using resistive devices and switches.

When grouping 2×2 pixels, the third switch $S_{03}$ connecting in series the resistive bolometer resistance $R_{11}$ to the resistive bolometer resistance $R_{21}$, the twenty-first switch $S_{21}$ connecting in series the resistive bolometer resistance $R_{21}$ to the resistive infrared device $R_{22}$, and the eighth switch $S_{08}$ connecting in series the resistive infrared device $R_{22}$ to the resistive infrared device $R_{12}$, are included.

When the first pixel group is driven, to connect in series the resistive infrared devices $R_{11}$, $R_{21}$, $R_{22}$ and $R_{12}$ of the 2×2 group, the third switch $S_{03}$, the twenty-first switch $S_{21}$, and the eighth switch $S_{05}$ are turned on. Then, when a first row selection signal is applied to the first pixel group, the first switch $S_{01}$ is turned on. When a second column selection signal is applied thereto, the sixth switch $S_{06}$ is turned on. An output signal according to a change in the series resistances $R_{11}$, $R_{21}$, $R_{22}$, and $R_{12}$ is output through the second column line $col_2$. As described above, a reference resistance value, for example, a value of a current flowing in the blind bolometer, is input to an amplification circuit.

Similarly to the above, when a second pixel group is driven, to connect in series the resistive infrared devices $R_{12}$, $R_{22}$, $R_{23}$, and $R_{13}$ of the next 2×2 group, the eighth switch $S_{08}$, the twenty-sixth switch $S_{26}$, and the thirteenth switch $S_{13}$ are turned on. According to a signal to select a pixel in the first row and the second column, the fifth switch $S_{05}$ is turned on. When a third column selection signal is applied to the second pixel group, the eleventh switch $S_{11}$ is turned on. An output signal according to a change in the series resistances $R_{12}$, $R_{22}$, $R_{23}$, and $R_{13}$ is output through the third column line $col_3$.

The temperature of an object to be measured is detected from the output signal with respect to all pixel groups by sequentially driving all pixel groups in the above-described method.

In an example embodiment, although the connection switches belonging to the first pixel group are turned on, the row or column selection signal is output, and the serially connected resistance values are measured, the disclosure is not limited thereto, and the row or column selection signal is first output and the connection switches belonging to the corresponding pixel group may be turned on.

In an example embodiment, a thermal infrared sensor array for measuring an electrical properties change of a plurality of resistive infrared devices arranged in a row direction or a column direction according to an infrared incidence amount is implemented. In this state, signals are measured by spatially grouping a plurality of neighboring devices, and the thermal infrared sensor array is implemented such that at least one device is simultaneously included in the spatially neighboring groups. Furthermore, the infrared resistive devices are connected in series within each group. Accordingly, problems according to the miniaturization of a pixel, for example, a decrease in the sensitivity due to an infrared absorption area decrease and a thermal conductivity increase, an increase in the noise equivalent temperature difference (NETD), or an increase of NETD 1/f due to a volume decrease of a bolometer material, may be solved.

Figure 4:
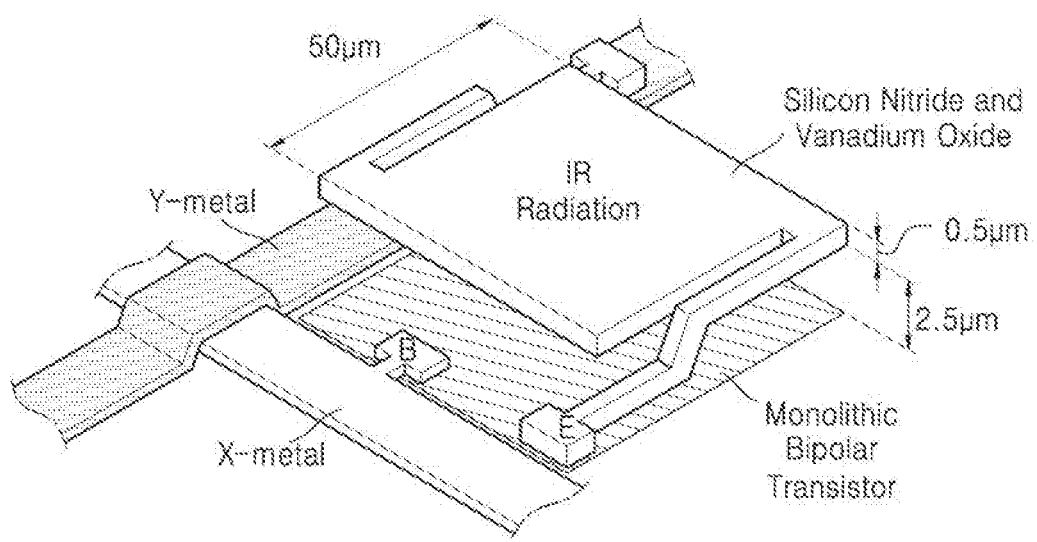
FIG. 4 is a schematic view of a pixel including the infrared resistive device of FIG. 1.

FIG. 4 is a schematic view of a pixel including the infrared resistive device of FIG. 1.

Referring to FIG. 4, a configuration of a microbolometer pixel is illustrated. An X-metal electrode (X-metal) and a Y-metal electrode (Y-metal) respectively correspond to the electrodes of the first to third row lines rows to $row_3$ and the electrodes of the first to third column lines $col_1$ to $col_3$, which are illustrated in FIG. 3. A portion that absorbs infrared light in the above may be an infrared resistive device or a bolometer resistance device. Although the above device may use a silicon nitride and a vanadium oxide, embodiments are not limited to these materials. The size of a pixel of a microbolometer is gradually decreasing. Recently, the pixel size is decreased to about 10 micrometers, and may reach about 8 micrometers in the near future. Accordingly, according to the pixel miniaturization, technical problems are generated, for example, as a pixel area and an active area are decreased, and a leg length is decreased, thermal conductivity is increased. The thermal infrared sensor array according to an example embodiment and a driving method thereof may have the effects of increasing an effective area of a sensor through group driving, and decreasing thermal conductivity. Furthermore, as data is obtained by shifting pixel by pixel, a resolution of a pixel pitch may be implemented, thereby implementing a high-resolution column image.

Figure 5:
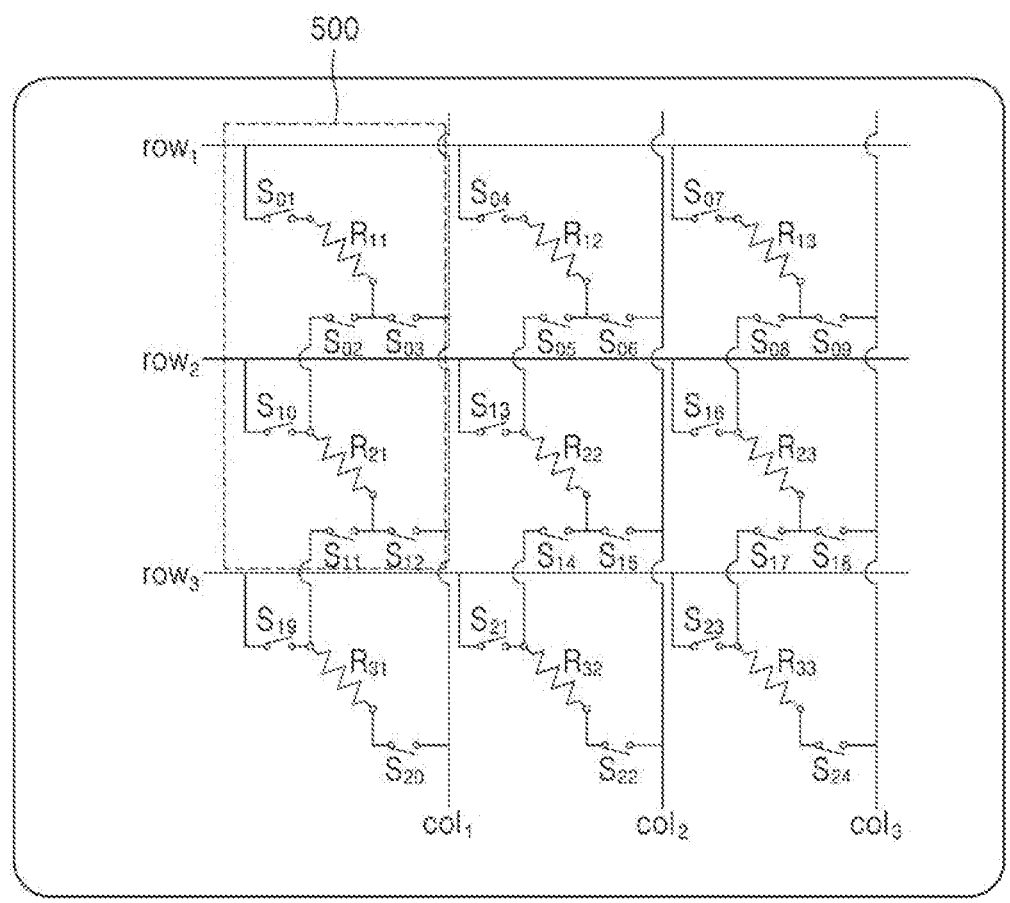
FIG. 5 is a pixel circuit diagram of 2×1 group driving according to another example embodiment.

FIG. 5 is a pixel circuit diagram for 2×1 group driving according to another example embodiment.

Referring to FIG. 5, a first pixel group 500 is described as an example of a pixel structure in which 2×1 pixel group signal detection is available in a 3×3 pixel array. The first pixel group 500 includes P11 and P21. The first switch $S_{01}$ is connected between one end of a bolometer resistance $R_{11}$ and the first row line rows, and the third switch $S_{03}$ is connected between the other end of the bolometer resistance $R_{11}$ and the first column line $col_1$. The second switch $S_{02}$ is connected between the bolometer resistance $R_{11}$ and the bolometer resistance $R_{21}$ that is grouped with the bolometer resistance $R_{11}$. The tenth switch $S_{10}$ is connected between one end of the bolometer resistance $R_{21}$ and the second row line $row_2$, and the twelfth switch $S_{12}$ is connected between the other end of the bolometer resistance $R_{21}$ and the first column line col1. As illustrated in FIG. 5, signals are sequentially read from 2×1 size pixel groups that are combinable in a 3×3 pixel array. Nine pixels are arranged in rows and columns at a certain interval, and are configured with three row lines and three column lines. The row lines $row_1$, $row_2$, and $row_3$ may be connected to bias power. The amplification circuit may be connected to the end of each of the first to third column lines $col_1$, $col_2$, and $col_3$, and which the reference voltage of an input port of the amplification circuit may be applied to. In the 3×3 pixel array, six 2×1 size pixel combinations are available such as $p_{11}$ & $p_{21}$, $p_{12}$ & $p_{22}$, $p_{13}$ & $p_{23}$, $p_{21}$ & $p_{31}$, $p_{22}$ & $p_{32}$, and $p_{23}$ & $p_{33}$. The number of 2×1 size pixel groups that are combinable in the M×N pixel array may be (M−1)×N. M and N each are natural numbers greater than or equal to 3. In the case of a bolometer method, bolometer resistances in a pixel group are connected in series, forming one group resistance. Ends of bolometer resistances in two pixels arranged in neighboring rows and included in the same column, the ends facing each other, are optionally connected to each other. The opposite end of a bolometer resistance belonging to the first row line is optionally connected to the row line, and the opposite end of a bolometer resistance belonging to the second row is connected to the column line. A signal by the group resistance may be read out through the first row line and the column line.

Figure 6:
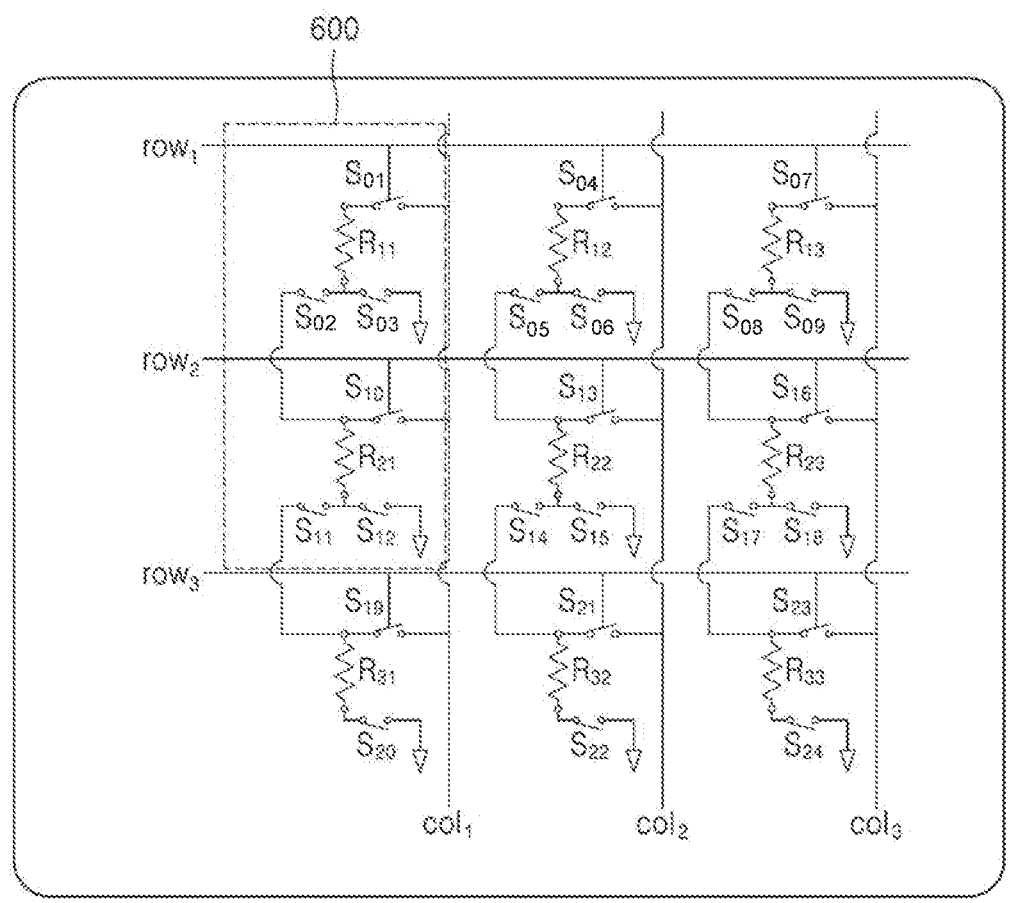
FIG. 6 is a pixel circuit diagram of 2×1 group driving according to another example embodiment.

FIG. 6 is a pixel circuit diagram for 2×1 group driving according to another example embodiment.

Referring to FIG. 6, a first pixel group 600 is described as an example of a pixel structure in which 2×1 pixel group signal detection is available in a 3×3 pixel array. The first pixel group 600 includes $P_{11}$ and $P_{21}$. The first switch $S_{01}$ is connected between one end of the bolometer resistance $R_{21}$ and the first column line $col_1$, and the third switch $S_{03}$ is connected between the other end of the bolometer resistance $R_{11}$ and a common ground terminal. The second switch $S_{02}$ is connected between the bolometer resistance $R_{11}$ and the bolometer resistance $R_{21}$ that is grouped with the bolometer resistance $R_{11}$. The tenth switch $S_{10}$ is connected between the one end of the bolometer resistance $R_{21}$ and the first column line $col_1$, and the twelfth switch $S_{12}$ is connected between the other end of the bolometer resistance $R_{21}$ and the common ground terminal.

FIG. 6 illustrates another pixel structure in which 2×1 pixel group signal detection is available in a 3×3 pixel array. A 2×1 pixel group including the bolometer resistance $R_{11}$ and the bolometer resistance $R_{21}$ is described. The bolometer resistance RH and the bolometer resistance $R_{21}$ may be connected in series by turning on the second switch $S_{02}$. In this state, by turning the twelfth switch $S_{12}$ on, the one end of the bolometer resistance $R_{21}$ is connected to a common bias voltage. Then, when the first switch $S_{01}$ is turned on in response to a control signal of the first row line $row_1$, the other end of the bolometer resistance $R_{11}$ is connected to the first column line $col_1$ so that signal detection is performed. Similarly, in the combinations of $R_{12}$ and $R_{22}$, $R_{13}$ and $R_{23}$, $R_{21}$ and $R_{31}$, $R_{22}$ and $R_{32}$, and $R_{23}$ and $R_{33}$, similar connections are made, and output data in the form of a 2×1 group array may be obtained through signal measurement.

Figure 7:
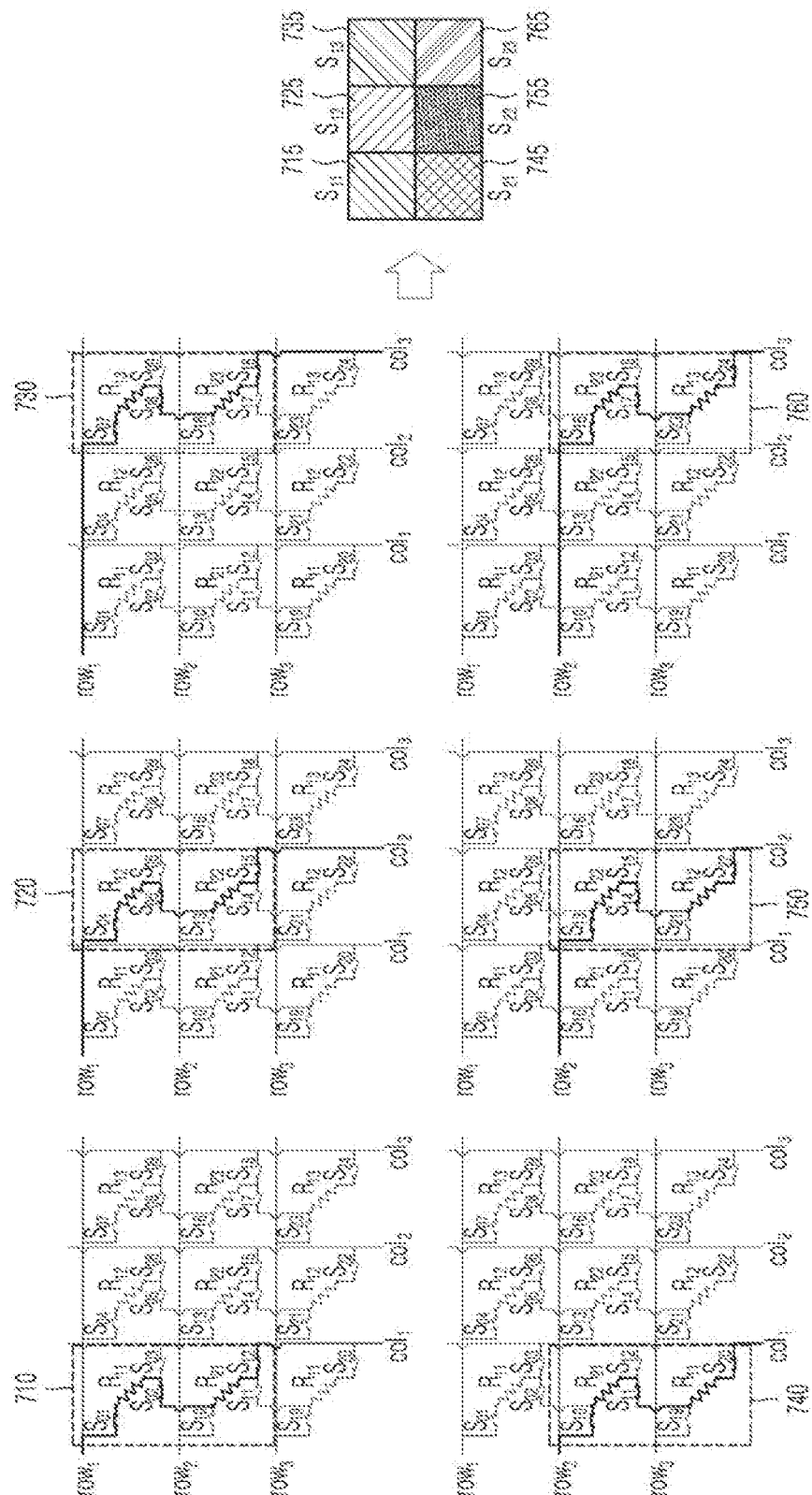
FIG. 7 is a circuit diagram of signal detection of the pixels of FIG. 5.

FIG. 7 is a circuit diagram of the signal detection of the pixels of FIG. 5.

Referring to FIGS. 5 and 7, signal detection of six pixel groups 710 to 760 is described.

For a first pixel group 710, the second switch $S_{02}$ is turned on, and the first switch $S_{01}$ and the twelfth switch $S_{12}$ are turned on. An output value 715 is obtained through the first column line $col_1$. Although, in the above description, the second switch $S_{02}$ is turned on, and then the first switch $S_{01}$ and the twelfth switch $S_{12}$ are turned on, the first switch $S_{01}$ and the twelfth switch $S_{12}$ may be turned on, and then the second switch $S_{02}$ may be turned on, or three switches may be simultaneously turned on.

For a second pixel group 720, the fifth switch $S_{05}$ is turned on, and then the fourth switch $S_{04}$ and the fifteenth switch $S_{15}$ are turned on. An output value 725 is obtained through the second column line $col_3$.

For a third pixel group 730, the eighth switch $S_{08}$ is tuned on, and then the seventh switch $S_{07}$ and the eighteenth switch $S_{18}$ are turned on. An output value 735 is obtained through the third column line $col_3$.

For a fourth pixel group 740, the eleventh switch $S_{11}$ is tuned on, and then the tenth switch $S_{10}$ and the twentieth switch $S_{20}$ are turned on. An output value 745 is obtained through the first column line $col_1$.

For a fifth pixel group 750, the fourteenth switch $S_{14}$ is tuned on, and then the thirteenth switch $S_{13}$ and the twenty-second switch $S_{22}$ are turned on. An output value 755 is obtained through the second column line $col_2$.

For a sixth pixel group 760, the seventeenth switch $S_{17}$ is tuned on, and then the sixteenth switch $S_{16}$ and the twenty-fourth switch $S_{24}$ are turned on. An output value 765 is obtained through the third column line $col_3$.

After driving the six pixel groups, a temperature value of an object to be measured may be obtained from the output values 715 to 765 and displayed.

In an example embodiment, although the first to sixth pixel groups 710 to 760 are described to be sequentially driven, embodiments are not limited thereto, and the first to sixth pixel groups 710 to 760 may be simultaneously driven. Furthermore, the first to third pixel groups 710 to 730 that do not overlap each other may be driven simultaneously, and then the fourth to sixth pixel groups 740 to 760 may be driven simultaneously.

Figure 8:
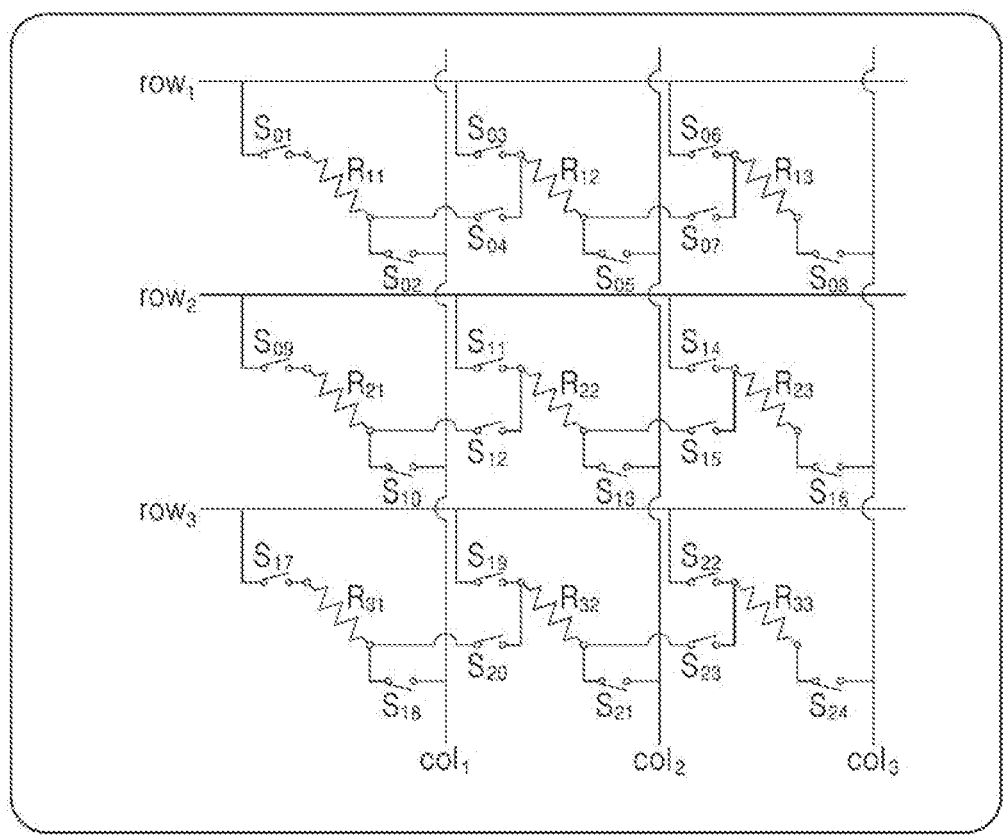
FIG. 8 is a pixel circuit diagram of 1×2 group driving according to another example embodiment.
Figure 9:
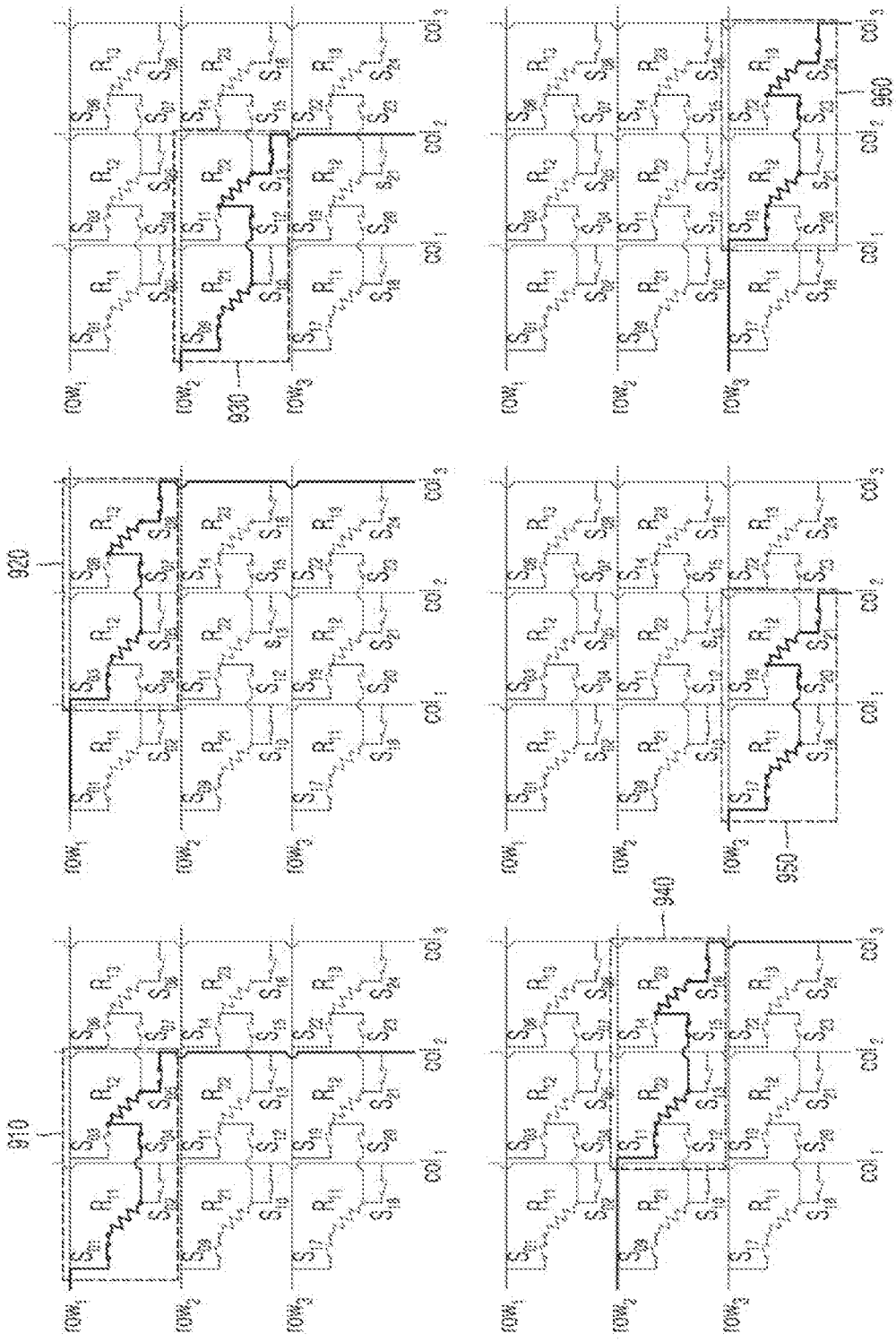
FIG. 9 is a circuit diagram of signal detection of the pixel of FIG. 8.

FIG. 8 is a pixel circuit diagram for 1×2 group driving according to another example embodiment. FIG. 9 is a circuit diagram of signal detection of the pixel of FIG. 8.

Referring to FIGS. 8 and 9, signal detection of six pixel groups 910 to 960 is described.

For a first pixel group 910, the fourth switch $S_{04}$ is tuned on, and then the first switch $S_{01}$ and the fifth switch $S_{05}$ are turned on. An output value is obtained through the second column line $col_2$.

For a second pixel group 920, the seventh switch $S_{07}$ is tuned on, and then the third switch $S_{03}$ and the eighth switch $S_{08}$ are turned on. An output value is obtained through the third column line $col_3$.

For a third pixel group 930, the twelfth switch $S_{12}$ is tuned on, and then the ninth switch $S_{09}$ and the thirteenth switch $S_{13}$ are turned on. An output value is obtained through the second column line $col_2$.

For a fourth pixel group 940, the fifteenth switch $S_{15}$ is tuned on, and then the eleventh switch $S_{11}$ and the sixteenth switch $S_{16}$ are turned on. An output value is obtained through the third column line $col_3$.

For a fifth pixel group 950, the twentieth switch $S_{20}$ is tuned on, and then the seventeenth switch $S_{17}$ and the twenty-first switch $S_{21}$ are turned on. An output value is obtained through the second column line $col_2$.

For a sixth pixel group 960, the twenty-third switch $S_{23}$ is tuned on, and then the nineteenth switch $S_{19}$ and the twenty-fourth switch $S_{24}$ are turned on. An output value is obtained through the third column line $col_3$.

Figure 10:
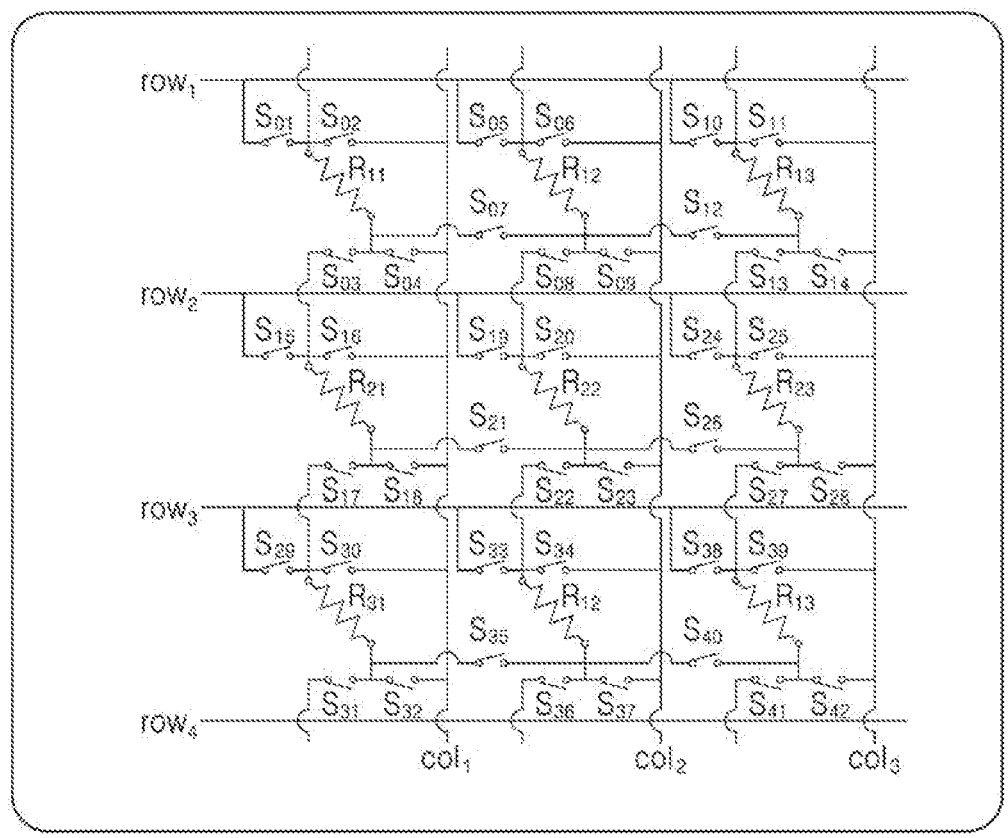
FIG. 10 is a pixel circuit diagram of m×n group driving according to another example embodiment.
Figure 11:
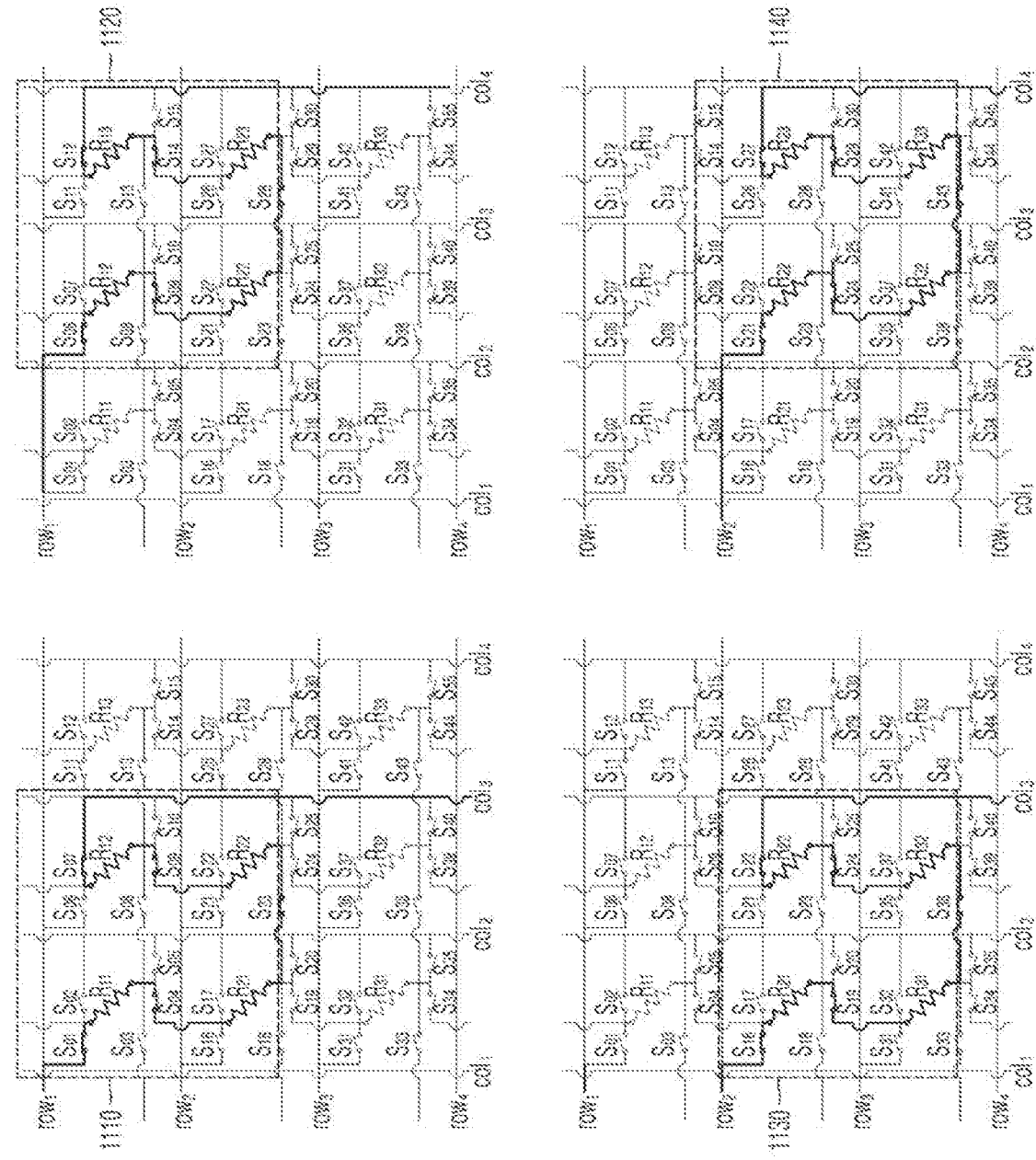
FIG. 11 is a circuit diagram of signal detection of the pixel of FIG. 10.

FIG. 10 is a pixel circuit diagram for m×n group driving according to another example embodiment. FIG. 11 is a circuit diagram of signal detection of the pixel of FIG. 10.

FIG. 10 illustrates a method of sequentially reading signals from 2×2 size pixel groups that are combinable from a 3×3 pixel array. As illustrated in FIGS. 10 and 11, nine pixels are arranged in rows and columns at a certain interval, and are configured in three row lines and three column lines. Row lines $row_1$, $row_2$, and $row_3$ may be connected to bias power. The amplification circuit may be connected to each of the ends of the column lines $col_1$, $col_2$, and $col_3$, and which the reference voltage of the input port of the amplification circuit may be applied to. In the 3×3 pixel array, as illustrated in FIG. 11, 2×2 size pixel groups are available as four pixel groups 1110, 1120, 1130, and 1140. The number of 2×2 size pixel groups that are combinable in the M×N pixel array is (M−1)×(N−1). M and N each are natural numbers greater than or equal to 3. In the bolometer method, bolometer resistances in a pixel group are connected in series, forming one group resistance.

For a first pixel group 1110, to connect the bolometer resistances $R_{11}$, $R_{21}$, $R_{22}$, and $R_{12}$ to each other, the fourth switch $S_{04}$, the twenty-third switch $S_{23}$, and the ninth switch $S_{09}$ are tuned on, and then the first switch $S_{01}$ and the seventh switch $S_{07}$ are turned on. An output value is obtained through the third column line $col_3$.

For a second pixel group 1120, to connect the bolometer resistances $R_{12}$, $R_{22}$, $R_{23}$, and $R_{13}$ to each other, the ninth switch $S_{09}$, the twenty-eighth switch $S_{28}$, and the fourteenth switch $S_{14}$ are tuned on, and then the sixth switch $S_{06}$ and the twelfth switch $S_{12}$ are turned on. An output value is obtained through the fourth column line $col_4$.

For a third pixel group 1130, to connect the bolometer resistances $R_{21}$, $R_{31}$, $R_{32}$, and $R_{22}$ to each other, the nineteenth switch $S_{19}$, the thirty-eighth switch $S_{38}$, the twenty-fourth switch $S_{24}$ are tuned on, and then the sixteenth switch $S_{16}$ and the twenty-second switch $S_{22}$ are turned on. An output value is obtained through the third column line $col_3$.

For a fourth pixel group 1140, to connect the bolometer resistances $R_{22}$, $R_{32}$, $R_{33}$, and $R_{23}$ to each other, the twenty-fourth switch $S_{24}$, the forty-third switch $S_{43}$, and the twenty-ninth switch $S_{29}$ are tuned on, and then the twenty-first switch $S_{21}$ and the twenty-seventh switch $S_{27}$ are turned on. An output value is obtained through the fourth column line $col_4$.

In an example embodiment, as several neighboring pixels are operated by being electrically connected to each other, an infrared radiation energy absorption amount may be increased as an effective area is increased, and as bolometer resistances in several pixels are connected in series to operate as one resistance, a resistance change amount according to a change of temperature may be increased. Accordingly, as an output signal from a thermal infrared sensor array increases, sensitivity and signal-to-noise ratio (SNR) may be improved, and a temperature resolution may be reduced.

Figure 12:
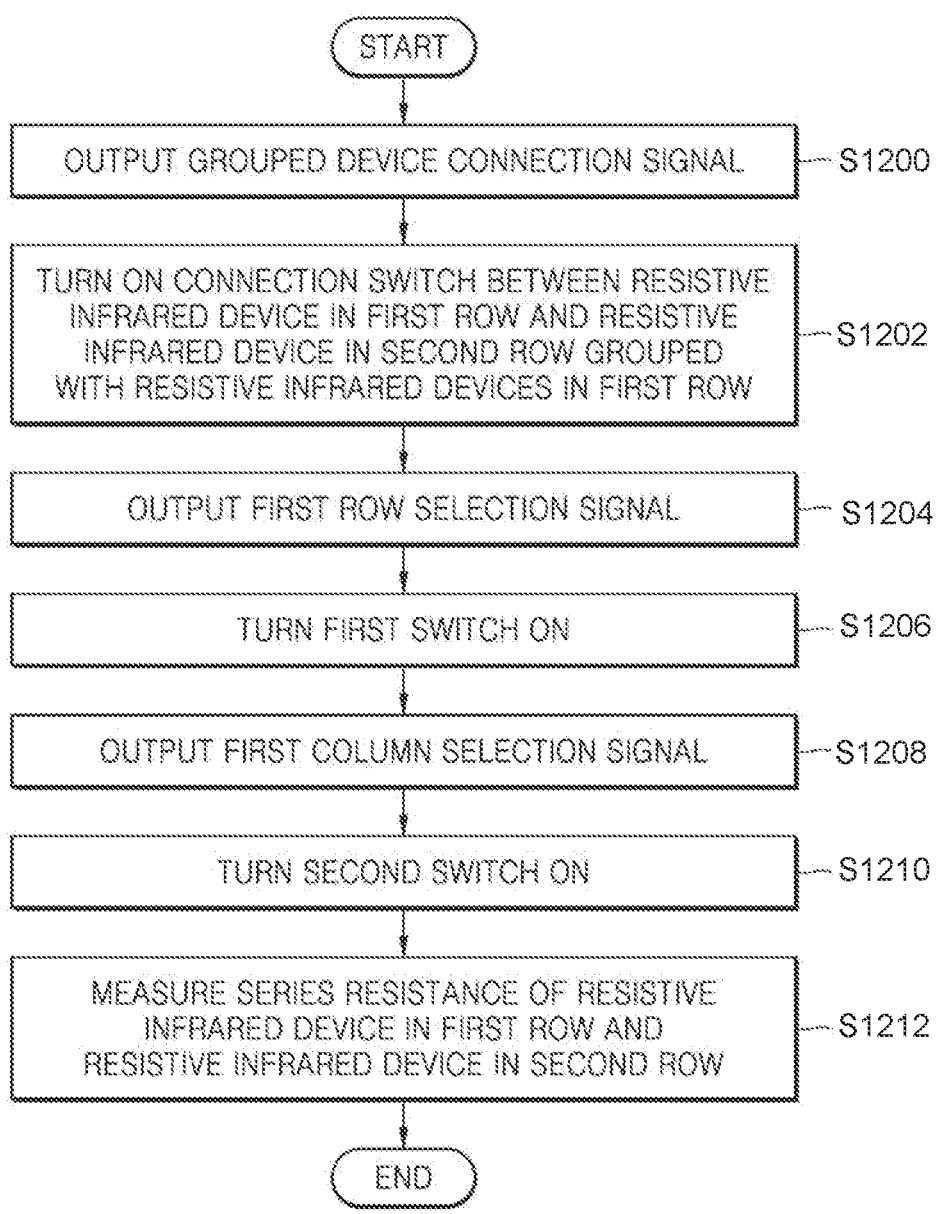
FIG. 12 is a flowchart of a method of driving a thermal infrared sensor array according to an example embodiment.

FIG. 12 is a flowchart of a method of driving a thermal infrared sensor array according to an example embodiment.

Referring to FIG. 12, a connection signal to connect a resistive infrared device of a first pixel to a grouped device is output (S1200). A connection switch connected between a resistive infrared device in a first row and a grouped resistive infrared device in a second row is turned on (S1202). In this state, the connection switch is connected between the resistive infrared device of the first pixel and the grouped device, a resistive infrared device of a pixel in the next row, and the connection switch is turned on in response to the connection signal. A first row selection signal is output (S1204). In response to the first row selection signal, a first switch is turned on (S1206). In this state, the first switch is connected between a first row line and one end of the resistive infrared device of the first pixel.

A first column selection signal is output (S1208). In response to the first column selection signal, a second switch is turned on (S1210). In this state, the second switch is connected between a first column line and a grouped resistive infrared device of a pixel in the next row.

Series resistance of the resistive infrared device in the first row and the resistive infrared device in the second row is measured (S1212).

In an example embodiment, for an M×N pixel array, an output signal is detected by an m×n group or grouping. In this state, M and N each are natural numbers, M and N each are greater than or equal to 3, m is a natural number less than M, and n is a natural number less than N. In this state, both m and n are not 1. In the example embodiment described with reference to FIG. 12, m is 2, n is 1, and the size of a group is 2×1. Although a process of detecting an output signal of one group is described in the example embodiment described with reference to FIG. 12, output signals may be sequentially detected with respect to groups of the entire pixel array.

Figure 13:
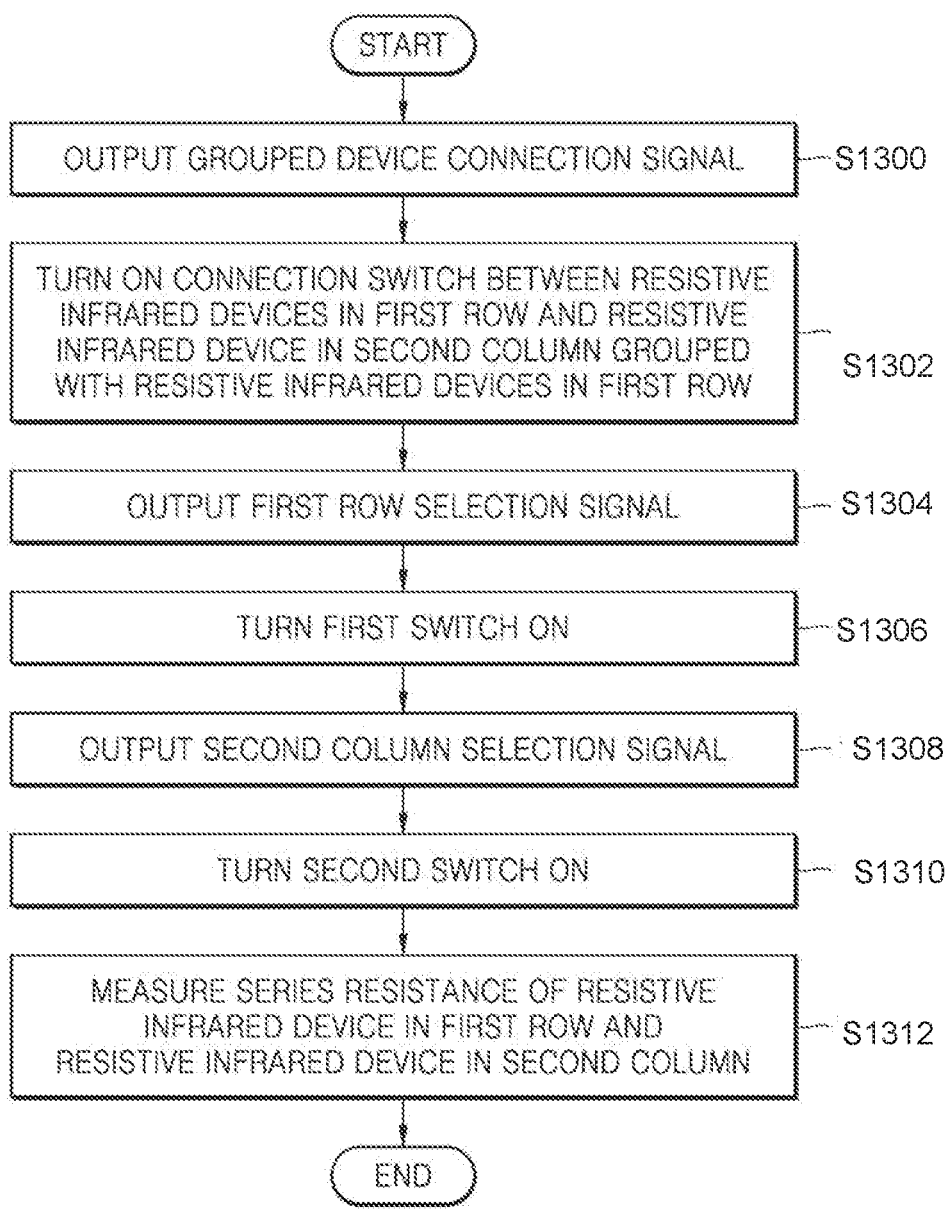
FIG. 13 is a flowchart of a method of driving a thermal infrared sensor array according to another example embodiment.

FIG. 13 is a flowchart of a method of driving a thermal infrared sensor array according to another example embodiment.

Referring to FIG. 13, a connection signal to connect a resistive infrared device of a first pixel to a grouped device is output (1300). A connection switch connected between a resistive infrared device in a first row and a grouped resistive infrared device in a second column is turned on (1302). In this state, the connection switch is connected between the resistive infrared device of the first pixel and a grouped device, a resistive infrared device of a pixel in the same row and the next column, and the connection switch is turned on in response to the connection signal.

A first row selection signal is output (1304). In response to the first row selection signal, a first switch is turned on (S1306). In this state, the first switch is connected between a first row line and one end of the resistive infrared device of the first pixel.

A second column selection signal is output (S1308). In response to the second column selection signal, a second switch is turned on (S1310). In this state, the second switch is connected between a second column line and a resistive infrared device of a pixel in the first row and the second column that are grouped.

Series resistance of the resistive infrared device in the first row and the resistive infrared device in the second column is measured (S1312).

In an example embodiment, for an M×N pixel array, an output signal is detected by an m×n group or grouping. In this state, M and N each are natural numbers, M and N each are greater than or equal to 3, m is a natural number less than M, and n is a natural number less than N. In this state, both m and n are not 1. In the example embodiment described with reference to FIG. 13, m is 1, n is 2, and the size of a group is 1×2. Although a process of detecting an output signal of one group is described in the example embodiment described with reference to FIG. 13, output signals may be sequentially detected with respect to groups of the entire pixel array.

Figure 14:
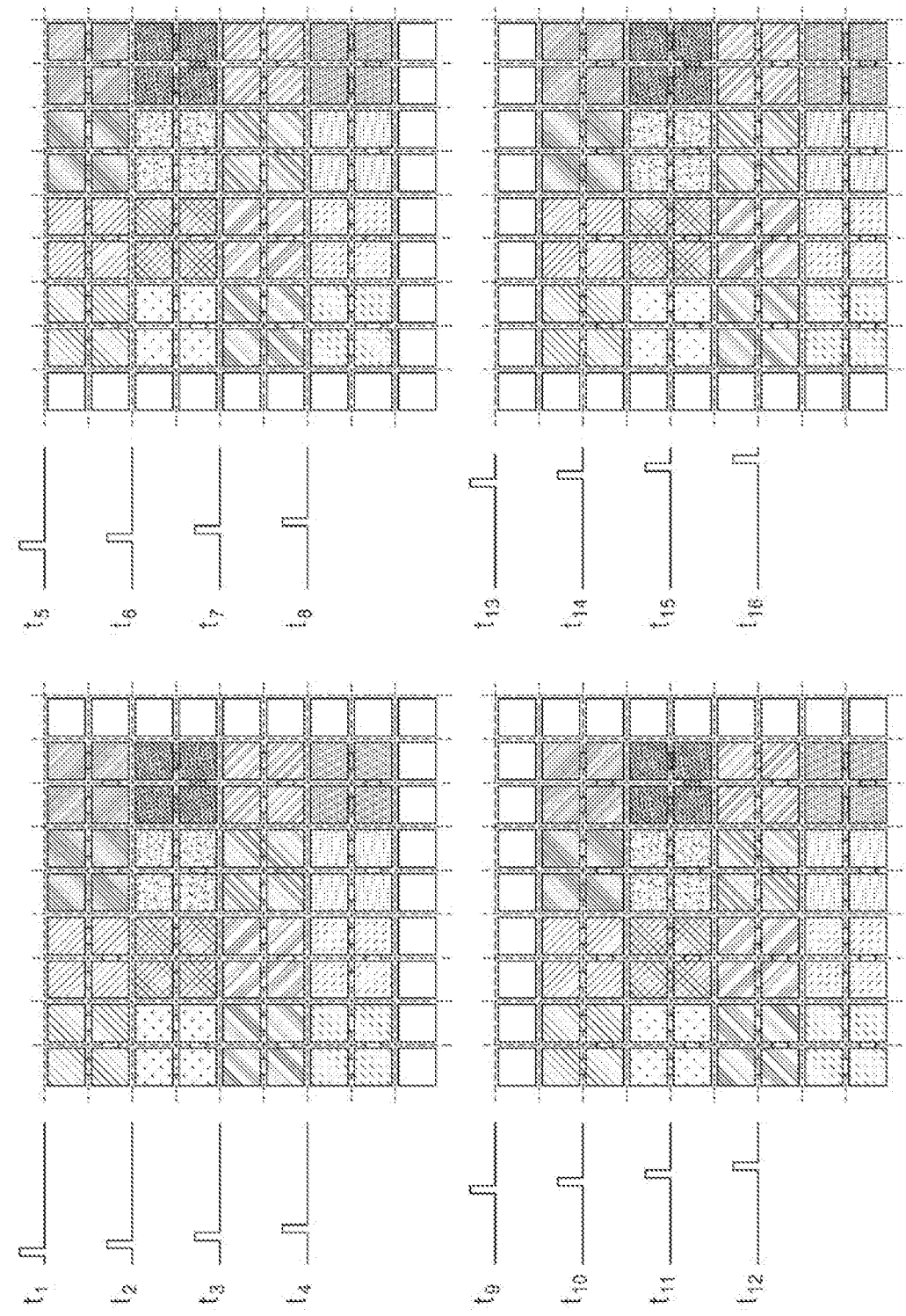
FIG. 14 is a timing diagram of a method of driving a thermal infrared sensor array according to another example embodiment.

FIG. 14 is a timing diagram of a method of driving a thermal infrared sensor array according to an example embodiment.

Referring to FIG. 14, a method of simultaneously detecting a signal in a 2×2 pixel group, by using 81 pixels in a 9×9 array, is illustrated. A signal is detected from a group consisting of pixels in first to eighth columns from t1 to t4. In this state, the detection of an output signal with respect to the 2×2 pixel group is the same as the description with reference to FIGS. 10 and 11. Signals are simultaneously detected from four pixel groups that do not overlap each other and are included in 1-2 rows at t1, 3-4 rows at t2, 5-6 rows at t3, and 7-8 rows at t4.

Next, signals are detected from groups consisting of pixels in 2 to 9 columns from t5 to t8. Likewise, signals are simultaneously detected from four pixel groups that do not overlap each other and are included in 1-2 rows at t5, 3-4 rows at t6, 5-6 rows at t7, and 7-8 rows at t8.

Next, signals are detected from a group consisting of pixels in 1-8 columns from t9 to t12. Signals are simultaneously detected from four pixel groups that do not overlap each other and are included in 2-3 rows at t9, 4-5 rows at t10, 6-7 rows at t11, and 8-9 rows at t12.

Finally, signals are detected from a group consisting of pixels in 2 to 9 columns from t13 to t16. Signals are simultaneously detected from four pixel groups that do not overlap each other and are included in 2-3 rows at t13, 4-5 rows at t14, 6-7 rows at t15, and 8-9 rows at t16. Data of 64 group pixels in an 8×8 array may be measured in the above method.

Figure 15:
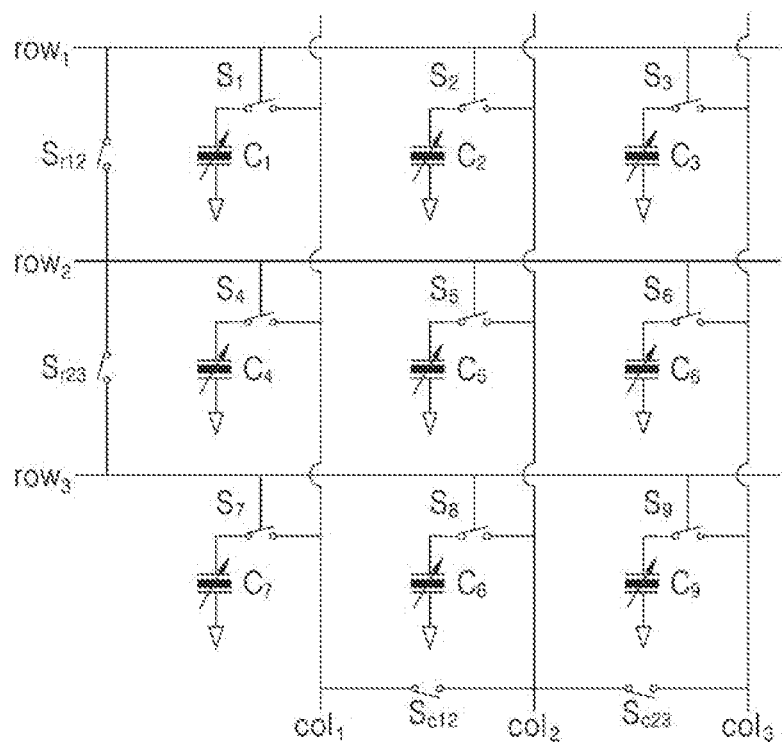
FIG. 15 is a pixel circuit diagram according to another example embodiment.

FIG. 15 is a pixel circuit diagram according to another example embodiment.

Referring to FIG. 15, a circuit structure capable of detecting a group in a pyroelectric far-infrared sensor is illustrated. Each pixel may include a temperature variable capacitance $C_x$ and a switch $S_x$. One end of the variable capacitance $C_x$ may be connected to the reference voltage, and the other end thereof may be connected to a column line according to the operation of the switch $S_x$. A switch is arranged between neighboring row lines and neighboring column lines. For example, in a group detection in a 2×2 pixel group, a switch $S_{r12}$ is turned on. When a turn-on signal is applied to the first row $row_1$, the first row $row_1$ and the second row line $row_2$ are simultaneously activated. When signals are detected from the first column $col_1$ or the second column $col_2$ by turning a switch $S_{c12}$ on, four capacitance sensors $C_1$, $C_2$, $C_4$, and $C_5$ are connected in parallel and operate as one capacitor.

The example embodiments may be written as computer programs and may be implemented in general-use digital computers that execute the programs using a computer readable recording medium. Furthermore, the structure of data used in the above-described example embodiments may be recorded in a computer-readable recording medium through various means. Examples of the computer readable recording medium include magnetic storage media (e.g., ROM, floppy disks, hard disks, etc.), optical recording media (e.g., CD-ROMs, or DVDs), etc.

As the thermal infrared detector according to an example embodiment is operated as several neighboring pixels are electrically connected to each other, a far-infrared radiation energy absorption amount may be increased as an effective area is increased.

Furthermore, as bolometer resistances in several pixels are connected in series to operate as one resistance, a resistance change amount according to a temperature change is increased and an output signal is increased so that sensitivity and SNR may be improved and a minimum temperature resolution may be further decreased.

Furthermore, as a pixel group area in which several neighboring pixels are electrically connected to each other is selected by moving in unit of one pixel, a resolution equivalent to a pixel pitch may be obtained.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A thermal infrared detector comprising:
a thermal infrared sensor array comprising a plurality of resistive infrared devices arranged in a plurality of rows and a plurality of columns; and
a driving circuit configured to drive the thermal infrared sensor array,
wherein at least two resistive infrared devices adjacent to each other in a row direction or a column direction, among the plurality of resistive infrared devices, are grouped together,
wherein at least one resistive infrared device among the plurality of resistive infrared devices is shared by at least two groups,
wherein at least two resistive infrared devices among the plurality of resistive infrared devices that are included in each of the at least two groups are connected in series, and
wherein each pixel among a plurality of pixels comprising each of the plurality of resistive infrared devices comprises:
a first switch having a first end connected to a row direction line and a second end connected to a first end of the each of the plurality of resistive infrared devices; and
a second switch having a first end connected to a column direction line and a second end connected to a second end of the each of the plurality of resistive infrared devices.

2. The thermal infrared detector of claim 1, further comprising a connection switch connected between the at least two resistive infrared devices included in each of the at least two groups.

3. The thermal infrared detector of claim 2, wherein a number of the plurality of rows is M, a number of the plurality of columns is N, and each of M and N is a natural number greater than or equal to 3.

4. The thermal infrared detector of claim 2, wherein the driving circuit is further configured to:
sequentially drive pixel groups comprising adjacent pixels among the plurality of pixels arranged in the plurality of rows and the plurality of columns; and
turn on the connection switch to measure series resistance of the at least two resistive infrared devices in each pixel group.

5. The thermal infrared detector of claim 2, wherein the driving circuit is further configured to:
output a connection signal to turn the connection switch on; and
output a first row selection signal to select a first row among the plurality of rows.

6. The thermal infrared detector of claim 1, wherein the driving circuit is further configured to:
output a first connection signal to turn on a connection switch that connects a first resistive infrared device in a first row among the plurality of rows to a grouped first resistive device in a second row;
output a first row selection signal to select the first resistive infrared device in the first row, such that the first switch connected to a first end of the first resistive infrared device in the first row is turned on based on the first row selection signal; and
output a first column selection signal to select a first column among the plurality of columns, such that the second switch connected to a second end of the first resistive infrared device in the second row is turned on based on the first column selection signal.

7. The thermal infrared detector of claim 6, wherein the driving circuit is further configured to:

output a second connection signal to turn on the connection switch that connects a second resistive infrared device in the first row to a grouped second resistive device in the second row;

output a first-second row selection signal to select the second resistive infrared device in the first row, such hat the first switch connected to a first end of the second resistive infrared device in the first row is turned on based on the first row selection signal; and output a second column selection signal to select a second column among the plurality of columns, such that the second switch connected to a second end of the second resistive infrared device in the second row is turned on based on the second column selection signal.

8. The thermal infrared detector of claim 1, wherein the driving circuit is further configured to:

output a first connection signal to turn on a connection switch that connects a first resistive infrared device in a first row among the plurality of rows to a grouped second resistive infrared device in the first row;

output a first row selection signal to select the first resistive infrared device in the first row among the plurality of rows, such that the first switch connected to a first end of the first resistive infrared device in the first row is turned on based on the first row selection signal; and output a second column selection signal to select a second column among the plurality of columns, such that the second switch connected to a second end of a second resistive infrared device in the first row is turned on based on the second column selection signal.

9. The thermal infrared detector of claim 8, wherein the driving circuit is further configured to:

output a second connection signal to turn on the connection switch that connects the second resistive infrared device in the first row to a grouped third resistive infrared device in the first row;

output a first-second row selection signal to select the second resistive infrared device in the first row among the plurality of rows, such that the first switch connected to a first end of the second resistive infrared device in the first row is turned on based on the first row selection signal; and output a third column selection signal to select a third column among the plurality of columns, such that the second switch connected to a second end of a third resistive infrared device in the first row is turned on based on the third column selection signal.

10. The thermal infrared detector of claim 1, wherein each of the plurality of resistive infrared devices comprises a bolometer.

11. A thermal infrared sensor array comprising:

a plurality of resistive infrared devices connected to M row electrodes and N column electrodes;

a plurality of first switches, each of the plurality of first switches comprising a first end connected to a first end of each of the plurality of resistive infrared devices and a second end connected to a corresponding row electrode line;

a plurality of second switches, each of the plurality of second switches comprising a first end connected to a second end of each of the plurality of resistive infrared devices and a second end connected to a corresponding column electrode line; and a plurality of connection switches connected in series between adjacent resistive infrared devices among the plurality of resistive infrared devices, to group at least two adjacent resistive infrared devices in a row direction or a column direction.

12. The thermal infrared sensor array of claim 11, wherein each of M and N is a natural number greater than or equal to 3, a size of a group is m in the row direction and n in the column direction, m is a natural number less than M, n is a natural number less than N, and both m and n are not 1.

13. The thermal infrared sensor array of claim 11, wherein at least two groups share at least one resistive infrared device.

14. The thermal infrared sensor array of claim 11, wherein each of the plurality of connection switches is provided at a first pixel comprising one of the plurality of resistive infrared devices, one of the plurality of first switches, and one of the plurality of second switches or a second pixel that is grouped with the first pixel that is adjacent to the second pixel in the row direction or the column direction.

15. The thermal infrared sensor array of claim 11, wherein each of the plurality of resistive infrared devices comprises a bolometer.

16. A method of driving the thermal infrared sensor array according to claim 11, the method comprising:

turning a connection switch among the plurality of connection switches on based on a connection signal, the connection switch being provided between one of the plurality of resistive infrared devices in an m-th row and one of the plurality of resistive infrared devices in an (m+1)-th row, the one of the plurality of resistive infrared devices in the (m+1)-th row being grouped with the one of the plurality of resistive infrared devices in the m-th row;

turning one of the plurality of first switches on based on an m-th row selection signal, the one of the plurality of first switches being connected to a first end of an resistive infrared device in the m-th row and an n-th column;

turning one of the plurality of second switches on based on an n-th column selection signal, the one of the plurality of second switches being connected to a second end of the resistive infrared device in the (m+1)-th row and the n-th column; and obtaining series resistance of the resistive infrared device in the m-th row and the n-th column and the resistive infrared device in the (m+1)-th row and the n-th column, wherein m is a natural number less than M and n is a natural number less than N.

17. A method of driving the thermal infrared sensor array according to claim 11, the method comprising:

turning a connection switch among the plurality of connection switches on based on a connection signal, the connection switch being provided between one of the plurality of resistive infrared devices in an m-th row and an n-th column and one of the plurality of resistive infrared devices in the m-th row and an (n+1)-th column, the one of the plurality of resistive infrared devices in the m-th row and the n-th column being grouped with the one of the plurality of resistive infrared devices in the m-th row and the (n+1)-th column;

turning one of the plurality of first switches on based on an m-th row selection signal, the one of the plurality of first switches being connected to a first end of an resistive infrared device in the m-th row and the n-th column;

turning one of the plurality of second switches on based on an (n+1)-th column selection signal, the one of the plurality of second switches being connected to a second end of the resistive infrared device in the m-th row and the (n+1)-th column; and obtaining series resistance of the resistive infrared device in the m-th row and the n-th column and the resistive infrared device in the m-th row and the (n+1)-th column, wherein m is a natural number less than M and n is a natural number less than N.

18. A method of driving a thermal infrared sensor, the method comprising:

turning a first switch on based on receiving an m-th row selection signal, the first switch being connected to a first end of each resistive infrared device among a plurality of resistive infrared devices in an m-th row and an n-th column;

selectively turning a switch on based on a connection signal, the switch being connected between the plurality of resistive infrared devices, to electrically serially connect P×Q resistive infrared devices included from the m-th row to a (m+P−1) th row and from the n-th column to an (n+Q−1-) th column;

turning a second switch on based on an (n+Q-1)-th column selection signal, the second switch being connected to a second end of each resistive infrared device among the plurality of resistive infrared devices in the (n+Q−1)-th column and from the m-th row to an (m+P−1)-th row; and obtaining series resistance of the P×Q resistive infrared devices, wherein m is a natural number less than M, n is a natural number less than N, P is a natural number less than M, Q is a natural number less than N, and both P and Q are not 1.

* * * * *